United States Patent [19]

Swart et al.

[11] Patent Number: 5,909,891
[45] Date of Patent: Jun. 8, 1999

[54] REAR-MOUNTED TOW HITCH FOR CONNECTING A TOWING VEHICLE ELECTRICAL SYSTEM TO AN ELECTRICAL SYSTEM OF A TOWED VEHICLE TRAILER, OR THE LIKE

[75] Inventors: Alan Charles Swart; Alen Paul Butler, both of Mooi River, South Africa

[73] Assignee: Tow-Go USA, L.L.C., Shreveport, La.

[21] Appl. No.: 08/816,689

[22] Filed: Mar. 13, 1997

[30] Foreign Application Priority Data

Jul. 22, 1996 [ZA] South Africa ............................ 96/6182

[51] Int. Cl.⁶ ........................................................ B60D 1/62
[52] U.S. Cl. ............................................................... 280/422
[58] Field of Search ...................................... 280/901, 422, 280/423.1, 420, 511–513; 200/61.58 R; 191/1 R; 439/34, 35, 540.1, 542, 569, 577, 12, 18, 20, 22, 29

[56] References Cited

U.S. PATENT DOCUMENTS

| | | |
|---|---|---|
| 1,931,752 | 10/1933 | Connors . |
| 2,313,481 | 3/1943 | Rendano . |
| 2,673,966 | 3/1954 | Larkin . |
| 3,181,887 | 5/1965 | Boylan et al. . |
| 3,694,006 | 9/1972 | Good ...................................... 280/511 |
| 3,756,624 | 9/1973 | Taylor .................................... 280/511 |
| 3,797,862 | 3/1974 | Letterman . |
| 3,937,292 | 2/1976 | Kincaid ................................ 280/423.1 |
| 4,015,887 | 4/1977 | Ross et al. . |
| 4,060,331 | 11/1977 | Domer et al. . |
| 4,283,072 | 8/1981 | Deloach, Jr. . |
| 5,104,138 | 4/1992 | Allen . |

Primary Examiner—Robert J. Oberleitner
Assistant Examiner—C. T. Bartz
Attorney, Agent, or Firm—Rothwell Figg Ernst & Kurz

[57] ABSTRACT

A rear mounted tow hitch has a body—to be mounted to the towing vehicle—with a support drum that has a circular recess in an upper surface of the support drum; the recess has a plurality of upwardly facing electrical contacts therein. A drum cover member covers the circular recess. The drum cover member has an upward extension having a universal ball extending from an upper surface of the drum cover member. The drum cover member has a plurality of downwardly facing electrical contacts for contacting the upwardly facing electrical contacts. The drum cover member has a downward extension which extends into a socket extending below an upper surface of the support drum. A lock releasably engages the downward extension of the drum cover member. The lock preferably includes a locking element slidably mounted within the support drum which engages the downward extension. The tow hitch further includes a towed vehicle mounting member having a socket for receiving the universal ball. The towed vehicle mounting member includes a lock which fixes the universal ball thereto such that said ball and said towed vehicle mounting member are maintained at a mutual angular orientation.

20 Claims, 2 Drawing Sheets

REAR-MOUNTED TOW HITCH FOR CONNECTING A TOWING VEHICLE ELECTRICAL SYSTEM TO AN ELECTRICAL SYSTEM OF A TOWED VEHICLE TRAILER, OR THE LIKE

BACKGROUND OF THE INVENTION

1. Field of the Invention

The present invention relates to rear-mounted vehicle tow hitches and, in particular, rear-mounted vehicle tow hitches having means to electrically connect an electrical system of a towing vehicle—the vehicle performing the towing function—to an electrical system of a towed vehicle, a towed trailer, or the like.

2. Description of the Background Art

A variety of vehicle tow hitches which connect electrical systems in towing and towed vehicles, and the like, are known in the art. However, such tow hitches have a variety of limitations and problems.

One such tow hitch is illustrated in U.S. Pat. No. 3,797,862 (Letterman). This tow hitch involves a roof-mounted tow hitch having a plate member in the form of a disc 64 having wipers 66 above a board 52 having concentric lands 58. The disc is supported in the position illustrated in FIG. 4 by the wipers 66. A rubber or flexible plastic material boot 100 covers the device. As the trailer tongue 20 swings about the upright axis 88 defined by the hitch ball 24 and its mating socket 22, the disc 64 is caused to rotate about the axis 88 due to the upward extending ears 84 secured to the disc 64 which are caused to rotate via the trailer tongue 20 (shown in FIGS. 1 and 2). This device has a number of limitations—for example, the boot 100 does not provide appreciable protection, the device is really only suitable as a roof-mounted device, the rotation of the disc 64 is imparted through the ears 84, and the device is complex and not easily accessed.

Another known tow hitch is illustrated in U.S. Pat. No. 4,283,072 (Deloach, Jr.). The '072 patent shows a rear-mounted trailer hitch having a ball section A having a cap section B. The cap has spring biased pin contacts 31–35 and the ball has contact surfaces 21–25. This device also has a variety a limitations—for example, among other things, the size of the space within which the contacts are placed is limited to the size of the ball itself, such that the contact area between the cap B and ball A is limited, and the size of the respective parts is similarly limited.

The deficiencies in the known devices for electrically and for mechanically connecting towing and towed vehicles, creates a need in the art for an improved method and apparatus like that of the present invention.

SUMMARY OF THE INVENTION

The present invention involves an improved tow hitch having advantages and benefits not found in existing tow hitch devices, and avoiding problems in the existing devices known in the art. The present invention provides an improved tow hitch arrangement which obviates the need for separate electrical connections between the towing vehicle and the towed vehicle.

According to one aspect of the invention a tow hitch arrangement comprises a first anchor arrangement adapted to be mounted to a towing vehicle, a second anchor arrangement adapted to be mounted to a towed vehicle and complementary electrical sliding contacts between the first and second anchor arrangements, which sliding contacts are in electrical contact with one another when the first and second anchor arrangements are in a connected configuration.

In a preferred form of the invention, the first anchor arrangement includes a first electrical connection disc having a plurality of concentric electrical contacts located thereon, each contact being electrically connected to a conductor which conductor are connected to the towing vehicle's electrical system; and the second anchor arrangement includes a second electrical connection disc including a plurality of contact pins mounted thereon, each contact pin being connected to a conductor which conductors are connected to the towed vehicles electrical system; characterized therein that in use, when the first and second anchor arrangements are in a connected configuration, the contact pins are in electrical connection with the electrical contacts on the first and second discs.

Further according to the invention, the first anchor arrangement comprises a mounting plate, a socket formation, with the first contact disc being located concentric with the socket formation; and the second anchor arrangement comprises an anchor pin adapted to mate with the socket formation on the fist anchor arrangement, with the second contact disc being located concentric with the anchor pin; characterized therein that the first an second anchor arrangements are in a connected configuration when the anchor pin is located within the socket formation, and the contact pins on the second contact disc are in electrical connection with the electrical contacts on the first contact disc.

The anchor pin on the second anchor arrangement may terminate in a ball formation, which ball formation may be adapted to mate with a towed vehicle mounting member.

The towed vehicle mounting member preferably includes a socket formation adapted to mate with the ball formation and a locking mechanism adapted to lick the mounting member with the ball formation. The locking arrangement may be in the form of a lock nut.

The towed vehicle mounting member is preferably adapted to be mounted by way of bolts or the like to a towed vehicle. In a preferred form of the invention, the towed vehicle mounting member is pivot able about the ball formation in a plane parallel to the longitudinal axis of the anchor pin in use.

Further according to the invention, the first anchor arrangement includes a locking device adapted to lock the anchor pin within the socket formation in use.

The anchor pin preferably includes an area of reduced diameter, and the locking device includes a locking pin adapted to locate in a hole which intersects the socket formation transversely, the locking pin including a flattened area which, when inside its complementary hole, is movable between a locked position in which the flattened area is not aligned with the socket formation and an unlocked position in which the flattened area is aligned with the socket information.

The locking pin may be biassed, preferably by way of a spring, towards its locked position. The locking pin may have a hole adapted to accommodate a safety lock to prevent movement towards its unlocked position.

The above and other advantages, features and aspects of the present invention will be more readily perceived from the following description of the preferred embodiments thereof taken together with the accompanying drawings and claims.

BRIEF DESCRIPTION OF THE DRAWINGS

The present invention is illustrated by way of example and not limitation in the accompanying drawings, in which like references indicate like parts, and in which.

DETAILED DESCRIPTION OF THE PREFERRED EMBODIMENTS

Figure 1:
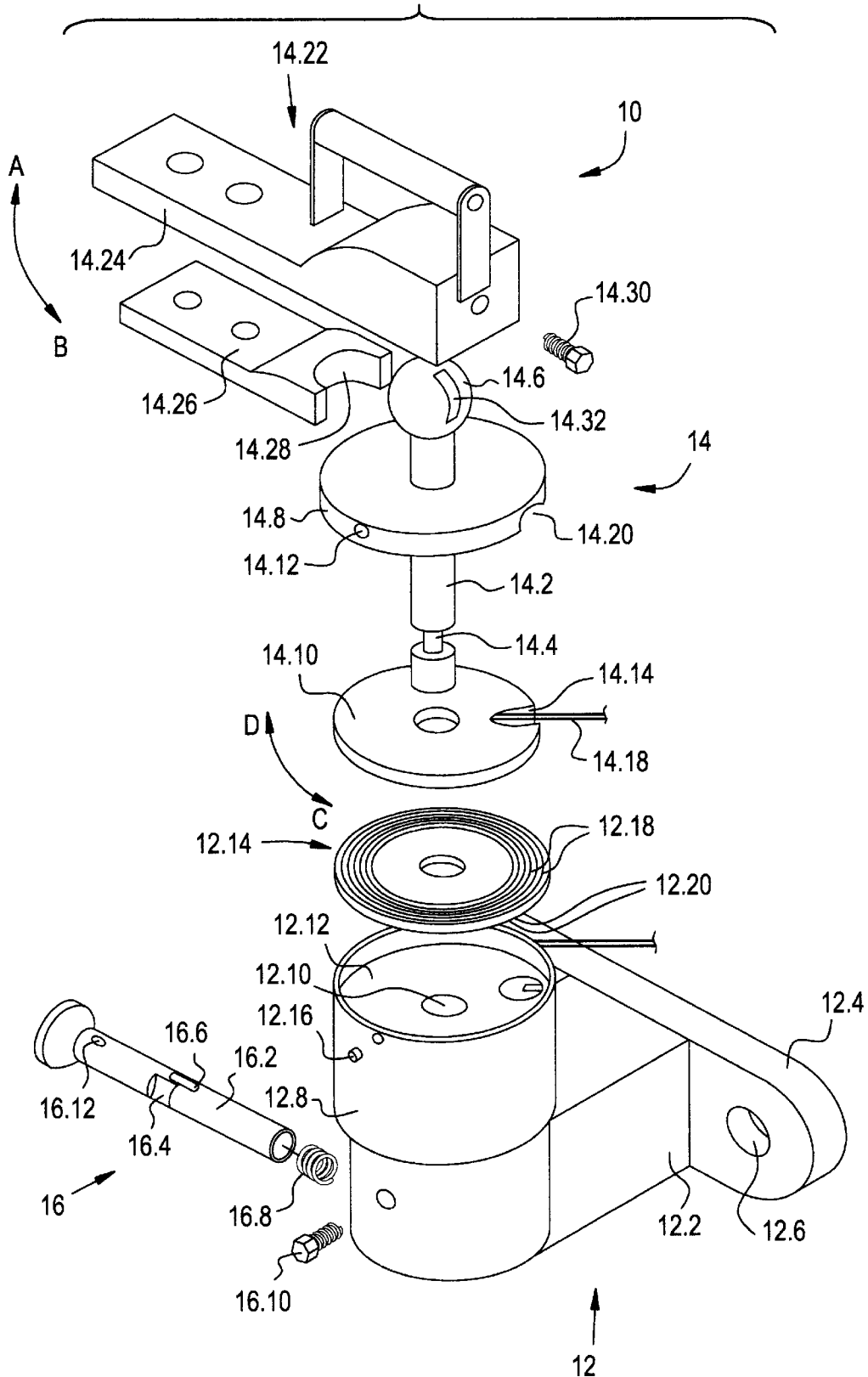
FIG. 1 is an exploded isometric view of a tow hitch arrangement according to the invention.

In the preferred embodiment illustrated in FIG. 1, a tow hitch arrangement 10 is shown to comprise a first anchor arrangement 12 and a second anchor arrangement 14.

First anchor arrangement 12 comprises a body 12.2 and a towing vehicle mounting plate 12.4 Mounting plate 12.4 includes holes 12.6 adapted to accommodate bolts (not shown) with which it can be mounted to the towing vehicle (not shown). A drum 12.8 is mounted transversely to body 12.2 as shown, which drum includes a socket formation 12.10 which extends along the longitudinal axis of the drum 12.8.

A bed 12.12 is located at the operatively upper end of drum 12.8 which locates in use the first contact disc 12.14. A grub screw 12.16 extends through the side wall of drum 12.8 to hold first contact disc 12.14 in position in bed 12.12. First contact disc 12.14 includes a plurality of concentric electrical contacts 12.18, each being an electrical connection with a corresponding conductor 12.20 which conductors extend to and are connected with the electrical system of the towing vehicle.

The second anchor arrangement includes an anchor pin 14.2 which is adapted to mate and fit inside the socket formation 12.10 Anchor pin 14.2 includes an area of reduced diameter 14.4 and terminates in a ball formation 14.6.

A hollow cover member 14.8 is provided around anchor pin 14.2 as shown which member provides a space for a second contact disc 14.10 which locates concentrically over anchor pin 14.2 A group screw 14.12 retains second contact disc 14.10 within the cover member 14.8.

The second contact disc 14.10 includes a plurality of spring loaded electrical pins 14.14 Pins 14.14 extend downwardly in the drawing (not shown) proud the lower surface of disc 14.10 and are arranged so that each pin is in electrical contact with one of the contacts 12.18 on the first contact disc 12.14 when discs 14.10 and 12.14 are in contact with each other. Each pin 14.14 is connected to a conductor 14.18, which conductors extend to and are connected with the electrical system of the towed vehicle (not shown). In use, electrical conductors 14.18 extend through an opening 14.20 in cover member 14.8.

A towed vehicle mounting member 14.22 is adapted to be attached to ball formation 14.6. Mounting member 14.22 includes a first member 14.24 which includes a socket formation (not shown) into which ball formation 14.6 extends in use. A second member 14.26 includes recessed head 14.28 which bears against ball formation 14.6 in use. First and second member 14.24 and 14.26 are adapted to be bolted together with bolts (not shown).

A lock nut 14.30 is used to retain mounting member 14.22 on ball formation 14.6. Ball formation 14.6 includes a slot 14.32 into which the end of lock nut 14.30 extends in use. This allows movement in directions A and B of mounting member 14.22 relative to ball formation 14.6.

In use mounting member 14.22 is mounted on ball formation 14.6 and locked with lock nut 14.30. Second contact disc 14.10 is locked by way of the grub screw 14.12 within cover member 14.8 and electrical conductors 14.18 extend via recess 14.20 to the electrical system of the towed vehicle.

The first contact disc 12.14 is located in bed 12.12 and locked in position by way of the grub screw 12.16.

Second anchor arrangement is mounted to a towed vehicle and when the vehicle needs to [be] towed, anchor pin 14.2 is inserted in socket formation 12.10.

A locking device 16 is further provided, which device comprises a locking pin 16.2 which includes a flattened surface 16.4 and a biassing spring 16.8. The locking pin 16.2 is in use inserted into a hole (not shown) which extends and transversely to and intersects socket formation 12.10. Pin 16.2 is movable within its complementary hole in directions F/G between a locked position (fully in direction G) and an unlocked position (fully in direction F). A guide slot 16.6 accommodating a guide bolt 16.10 are provided to restrict the movement of the pin in directions F and G. Pin 16.2 is biassed fully in direction G, i.e. its locked position, but spring 16.8 and when in this position, the flattened area is out of alignment with the socket formation 12.10 and if anchor pin 14.2 is at that point in the socket formation, its area of reduced diameter 14.4 is keyed around pin 16.2, thus locking the anchor pin 14.2 in the socket formation 12.10. In order to remove the anchor pin 14.2, the locking pin 16.2 needs to be moved in direction F against the force of the spring 16.8 which brings the flattened are in alignment with socket formation 12.10 thus allowing space for the anchor pin 14.2 to be retracted from the socket formation 12.10.

A hole 16.2 is provided to accommodate a safety lock such as a pin or a padlock (not shown) to prevent movement of locking pin 16.2 in direction F.

When the anchor pin 14.2 is inserted and locked as described above the contact pins 14.14 are in electrical contact with the concentric contacts 12.18. Furthermore, the second anchor arrangement is rotatable in socket formation 12.10 in directions D/E. An electrical connection between the first and second contact discs are maintained via the pins 14.14 and contacts 12.18, plus providing electrical continuity from the towing vehicle's electrical system to the towed vehicles electrical system.

Figure 2:
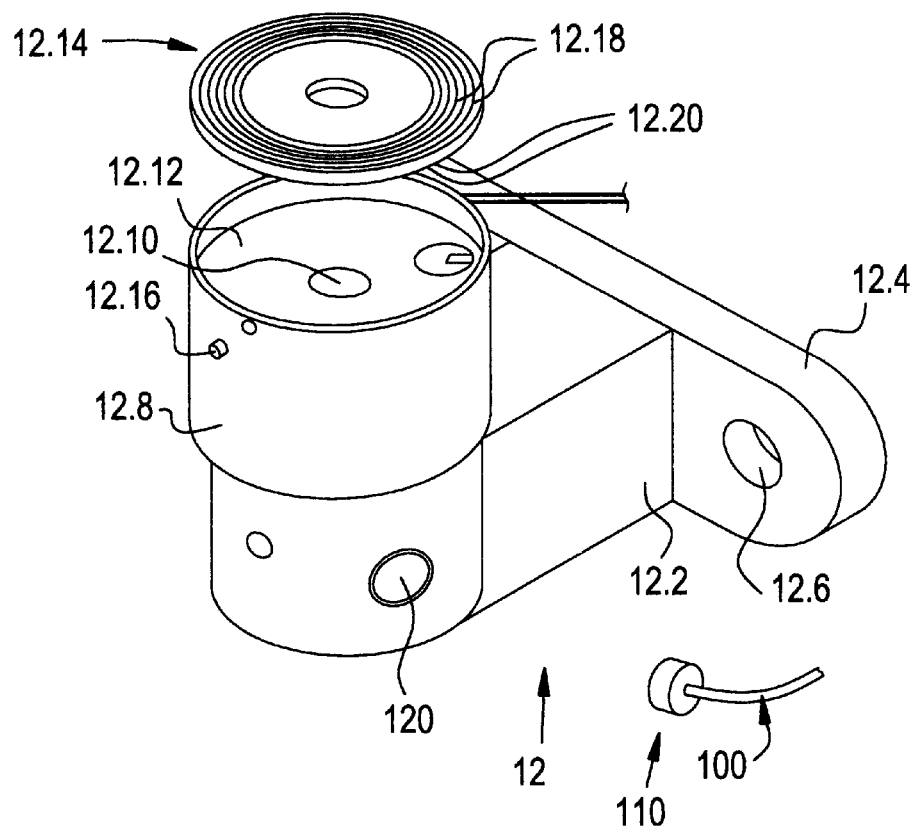
FIG. 2 is an exploded isometric view of parts of a tow hitch arrangement according to further embodiments of the invention.

In the embodiment illustrated in FIG. 2, the electrical systems of the towing and towed vehicles are performed via plug and socket connections. In this manner, the present structure is easily adapted to tailer connections utilizing electrical plug and socket connections between the towing and towed vehicles—i.e., conventional "pig tail" connections can be used with the present structure. As shown in FIG. 2, the wiring 200 can be detachably connected via plug 210 and socket 220 and/or the wiring 100 can be detachably connected via the plug 110 and socket 120. Accordingly, the device is very adaptable and can easily be used with existing systems. FIG. 2 also illustrates a modification wherein the ball 14.6 and the cover member 14.8 are connected via a more contoured extension member. Among other things, this can enhance the strength and rigidity of the device.

As a result of the present system, the electrical system of the towed structure can be effectively and securely made to be operated from within the towing vehicle—operating, for example, the brake lights, the brakes themselves, the turning lights, the radio system, the air conditioning system or the like.

While the present invention has been shown and described with reference to preferred embodiments presently contemplated as best modes for carrying out the invention, it is understood that various changes may be made in adapting the invention to different embodiments without departing from the broader inventive concepts disclosed herein and comprehended by the claims which follow. As one example, as an accessory, a conventional ball formation may be provided for fitment on first anchor arrangement 12.

What is claimed is:

1. A rear mounted tow hitch, comprising:

a) a body having a support drum, a circular recess in an upper surface of the support drum;

b) a plurality of electrical contacts within said circular recess;

c) a drum cover member sized to cover said recess, said drum cover member having an upward extension with a universal ball extending from an upper surface of said drum cover member, said drum cover member having a plurality of upper electrical contacts for contacting said electrical contacts within said circular recess;

d) said drum cover member having a downward extension which extends below an upper surface of said support drum;

e) a lock which releasably engages said downward extension of said drum cover member, whereby said drum cover member can be unlocked and removed and said upper and lower electrical contacts can be accessed.

2. The tow hitch of claim 1, wherein said downward extension is an elongated pin extending below said cover member, and said lock includes a locking element slidably mounted within said support drum which engages said pin.

3. The tow hitch of claim 1, further including a towed vehicle mounting member having a socket for receiving said universal ball.

4. The tow hitch of claim 3, wherein said towed vehicle mounting member includes a lock mechanism which fixes said universal ball thereto such that said ball and said towed vehicle mounting member are maintained at a mutual angular orientation.

5. The tow hitch of claim 4, wherein said lock mechanism includes a vertical slot in said ball and a screw in said towed vehicle mounting member.

6. The tow hitch of claim 3, wherein said support drum includes towing vehicle electrical conductors extending from said electrical contacts within said circular recess to connect with the electrical system of a towing vehicle, and wherein said cover member includes towed vehicle electrical conductors extending from said upper electrical contacts to connect with the electrical system of a towed vehicle.

7. The tow hitch of claim 6, wherein said electrical contacts within said circular recess include a plurality of concentric electrical contacts each being connected to respective ones of said towing vehicle electrical conductors, and said upper electrical contacts include a plurality of spring biased contact pins each being connected to respective ones of said towed vehicle conductors.

8. The tow hitch of claim 6, wherein said upper electrical contacts are supported on an upper contact disc fixed within the drum cover member and said electrical contacts within said circular recess are supported on a lower contact disc fixed within said support drum.

9. The tow hitch of claim 8, wherein said upper and lower contact discs are fixed to the drum cover member and support drum, respectively, via screws.

10. The tow hitch of claim 3, wherein said body having said support drum includes means for mounting to the rear end of a towing vehicle and said towed vehicle mounting member includes means for mounting to a towed vehicle.

11. A rear mounted tow hitch, comprising:

a) a body having a support drum, a circular recess in an upper surface of the support drum;

b) electrical contacts within said circular recess;

c) a disc shape drum cover member having a diameter sized to cover said circular recess, an extension extending from an upper surface of said drum cover member, said extension having a universal ball at the top thereof, said diameter of said drum cover member being substantially larger than a diameter of said universal ball;

d) upper electrical contacts within said drum cover member, said upper electrical contacts electrically contacting said electrical contacts within said circular recess when said drum cover member is in a covering position over said support drum;

e) a lock which releasably locks said drum cover member in said covering position over said support drum, whereby said drum cover member can be unlocked and removed and said electrical contacts can be accessed.

12. The tow hitch of claim 11, wherein said lock includes an elongated pin extending below said cover member, said pin having a portion which is lockingly engaged with a locking element slidably mounted within said drum.

13. A rear mounted tow hitch, comprising:

a) an towing vehicle body having an enclosure with a base portion and a cover portion;

b) upper and lower electrical contact discs within said enclosure, said upper contact disc being fixed with respect to said cover portion and said lower contact disc being fixed with respect to said base portion;

c) said cover portion being rotatably supported on said base portion;

d) a support member extending upward from and fixedly connected to an upper surface of said cover portion so as to be rotatably supported on said base portion, said support member having a universal ball at the upper end.

14. The tow hitch of claim 13, further including a means for releasably engaging said cover portion to said base portion.

15. The tow hitch of claim 13, further including a towed vehicle mounting member having a socket for receiving said ball.

16. The tow hitch of claim 13, further including an elongated pin portion extending below said cover portion and into a socket within said base portion, and means for releasably engaging said pin portion within said socket.

17. The tow hitch of claim 15, wherein said towed vehicle mounting member includes a locking mechanism for fixing said ball thereto such that said ball and said towed vehicle mounting member are maintained at a mutual angular orientation.

18. The tow hitch of claim 17, wherein said locking mechanism includes a vertical slot in said ball and a screw in said towed vehicle mounting member.

19. The tow hitch of claim 13, wherein said base portion includes towing vehicle electrical conductors extending from said lower electrical contacts to connect with the electrical system of a towing vehicle, and wherein said cover portion includes towed vehicle electrical conductors extending from said upper electrical contacts to connect with the electrical system of a towed vehicle.

20. A rear mounted tow hitch, comprising:

a) a body having a support drum with a circular recess in an upper surface of the support drum and an annular wall surrounding said circular recess, a lower wall of said circular recess having a smaller anchor pin recess therein for receiving an anchor pin;

b) concentric curved contacts within said circular recess;

c) an elongated anchor pin having a ball at an upper end thereof and having an integral cover member sized to cover said circular recess, said cover member including a plurality of electrical contact pins alignable with said curved contacts;

d) means for releasably engaging said anchor pin in said anchor pin recess.

* * * * *